(12) United States Patent
Friedman et al.

(10) Patent No.: US 9,141,396 B2
(45) Date of Patent: *Sep. 22, 2015

(54) LIVE INITIALIZATION OF A BOOT DEVICE

(71) Applicant: INTERNATIONAL BUSINESS MACHINES CORPORATION, Armonk, NY (US)

(72) Inventors: Alex Friedman, Herzliya (IL); Constantine Gavrilov, Rishon-Le-Zion (IL); Artemy Voikhansky, Petah Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/829,612

(22) Filed: Mar. 14, 2013

(65) Prior Publication Data

US 2014/0281450 A1  Sep. 18, 2014

(51) Int. Cl.
*G06F 9/24* (2006.01)
*G06F 15/177* (2006.01)
*G06F 9/44* (2006.01)
*G06F 11/14* (2006.01)
*G06F 3/06* (2006.01)
*G06F 11/34* (2006.01)

(52) U.S. Cl.
CPC .......... *G06F 9/4401* (2013.01); *G06F 11/1417* (2013.01); *G06F 3/0683* (2013.01); *G06F 11/1458* (2013.01); *G06F 11/1469* (2013.01); *G06F 11/3419* (2013.01)

(58) Field of Classification Search
CPC .............. G06F 3/0683; G06F 11/1458; G06F 11/1469; G06F 11/3419
USPC .................................................. 713/1, 2, 100
See application file for complete search history.

(56) References Cited

U.S. PATENT DOCUMENTS

| | | | |
|---|---|---|---|
| 7,516,319 B2 | 4/2009 | Chen | |
| 7,546,449 B2 | 6/2009 | Wu | |
| 7,546,450 B2 | 6/2009 | Danielsen | |
| 7,594,068 B2 | 9/2009 | Diehl | |
| 7,650,490 B2 | 1/2010 | Barron, Jr. et al. | |
| 7,949,814 B2 | 5/2011 | Chan | |
| 2002/0097687 A1* | 7/2002 | Meiri et al. .................... | 370/254 |
| 2004/0073783 A1 | 4/2004 | Ritchie | |
| 2009/0150598 A1 | 6/2009 | Jung et al. | |
| 2010/0058041 A1 | 3/2010 | John et al. | |

FOREIGN PATENT DOCUMENTS

EP  1764687 B1  3/2010

OTHER PUBLICATIONS

Lin Tao et al., "Implementation of Linux in embedded system," Control & Automation No. 7: 27-149, 2005.

* cited by examiner

*Primary Examiner* — Michael J Brown
(74) *Attorney, Agent, or Firm* — Griffiths & Seaton PLLC (57) ABSTRACT

Apparatus and computer program products implement embodiments of the present invention that include executing, by a processor, a software stack. A writeable boot device such as a storage device with a removable medium is detected, and upon reaching a boot level threshold for the software stack, the software stack is saved to the writeable boot device as a boot image.

11 Claims, 5 Drawing Sheets

LIVE INITIALIZATION OF A BOOT DEVICE

CROSS-REFERENCE TO RELATED APPLICATIONS

This application is related to U.S. patent applications Ser. Nos. 13/829,906, 13/830,019, 13/830,081, and 13/830,153, each filed Mar. 14, 2013, and which are incorporated herein by reference.

FIELD OF THE INVENTION

The present invention relates generally to computer systems, and specifically to performing a live initialization or a live update of a boot device.

BACKGROUND

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby enabling the computer to skip some hardware initializations and resets. Additionally, during a warm boot the memory may be reset.

In addition to a warm boot and a cold boot, the Linux operating system offers a method of rapidly booting a new operating system kernel via the kexec function. The kexec function first loads a new kernel into memory and then immediately starts executing the new kernel. Using kexec to boot a new kernel is referred to a "hot" reboot, since the computer's memory is not reset during the boot.

The description above is presented as a general overview of related art in this field and should not be construed as an admission that any of the information it contains constitutes prior art against the present patent application.

SUMMARY

There is provided, in accordance with an embodiment of the present invention a method, including executing, by a processor, a software stack, detecting a writeable boot device coupled to the processor, and saving the software stack to the writeable boot device as a boot image.

There is also provided, in accordance with an embodiment of the present invention a storage system, including a memory configured to store a software stack, and a processor configured to execute the software stack, to detect a writeable boot device, and to save the software stack to the writeable boot device as a boot image.

There is further provided, in accordance with an embodiment of the present invention a computer program product, the computer program product including a non-transitory computer readable storage medium having computer readable program code embodied therewith, the computer readable program code including computer readable program code configured to execute a software stack, computer readable program code configured to detect a writeable boot device, and computer readable program code configured to save the software stack to the writeable boot device as a boot image.

BRIEF DESCRIPTION OF THE DRAWINGS

The disclosure is herein described, by way of example only, with reference to the accompanying drawings, wherein.

DETAILED DESCRIPTION OF EMBODIMENTS

In computing, a boot comprises an initial set of operations that a computer performs when electrical power is switched on (also referred to as power cycling). During a boot, a computer may load software components such as an operating system kernel, services and applications. For example a service may comprise a process (also referred to as a daemon) configured to process input/output (I/O) requests, and an application may comprise configuration software that a user can execute on the computer. The software components that are loaded during a boot are typically stored in a system startup configuration file. For example, during a boot, a computer configured as a storage system may load a Linux operating system kernel, a network TCP/IP service and a storage application configured to process input/output (I/O) requests received from one or more host computers.

Software components that are loaded during a boot can be stored on a boot device as a boot image. When a computer system boots, the boot image is retrieved and stored in memory as a software stack. In other words, a loaded software stack may comprise an in-memory representation of a corresponding boot image on a boot device.

At a time subsequent to retrieving the boot image and executing the software stack, a computer may detect a failure or a "hiccup" (i.e., an intermittent hardware problem) in the boot device, and issue a notification to an operator. Upon receiving the notification the operator can replace the failed boot device with a replacement writeable boot device that may not have a boot image (or a current boot image). Embodiments of the present invention provide methods and systems for initializing the replacement writeable boot device. In some embodiments, the software stack executing on the computer is saved as a boot image to the replacement boot device.

Additionally, there may be instances (e.g., in a production environment) when the computer is executing a first software stack, and a "hot" upgrade is then performed to upgrade one or more components of the software stack. The hot upgrade from a first software stack to a second (i.e., updated) software stack can be performed while the computer is in operation, without necessitating a physical reboot of the computer. Embodiments of the present invention provide methods and systems for replacing, on a boot device, a boot image comprising the first software stack with a boot image comprising the second software stack.

While the embodiments described herein relate generally to a storage system such as clustered storage controller, it will be understood that embodiments of the present invention may also be used, mutatis mutandis, for other types of computer systems.

Figure 1:
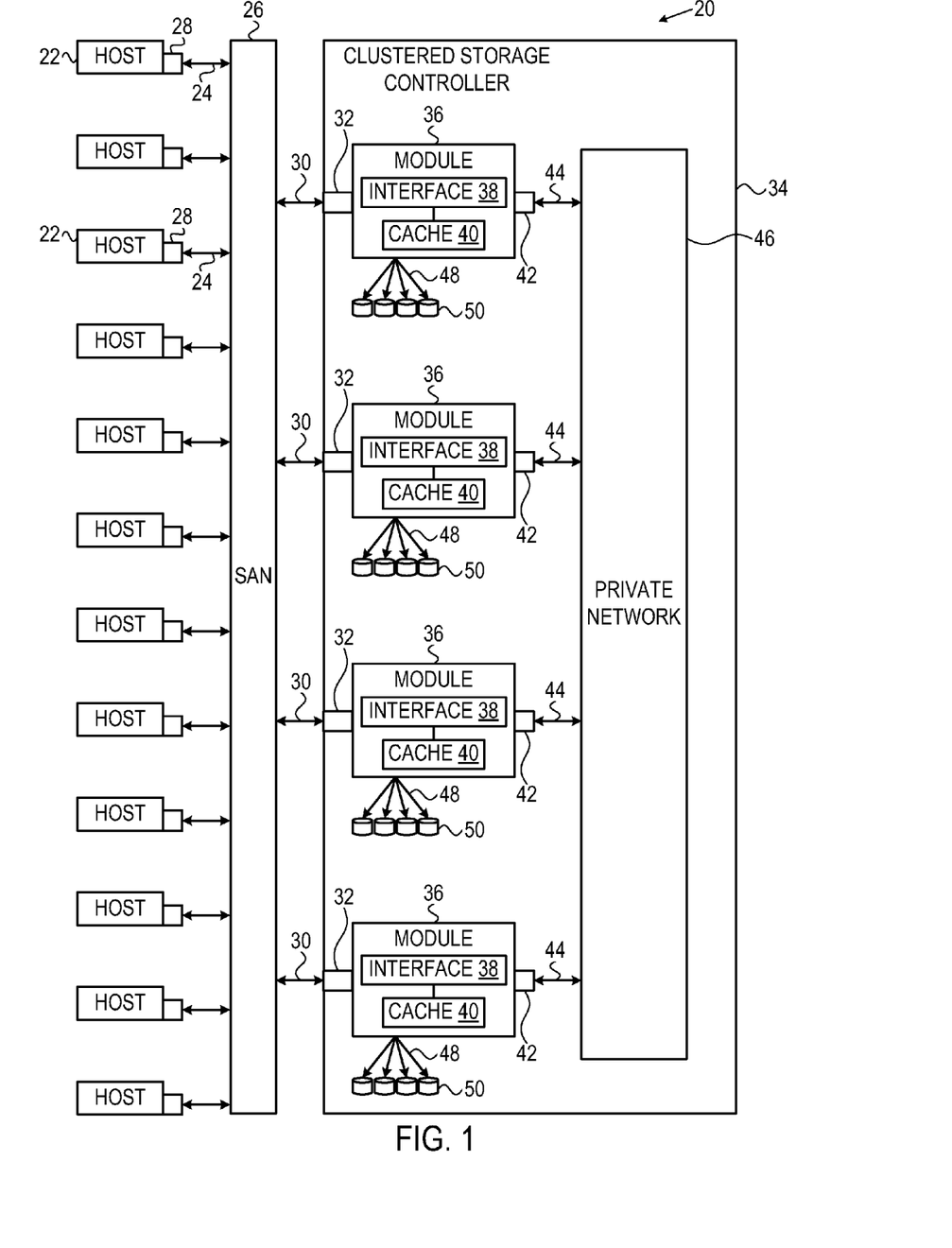
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Boot Device Initialization

Figure 2:
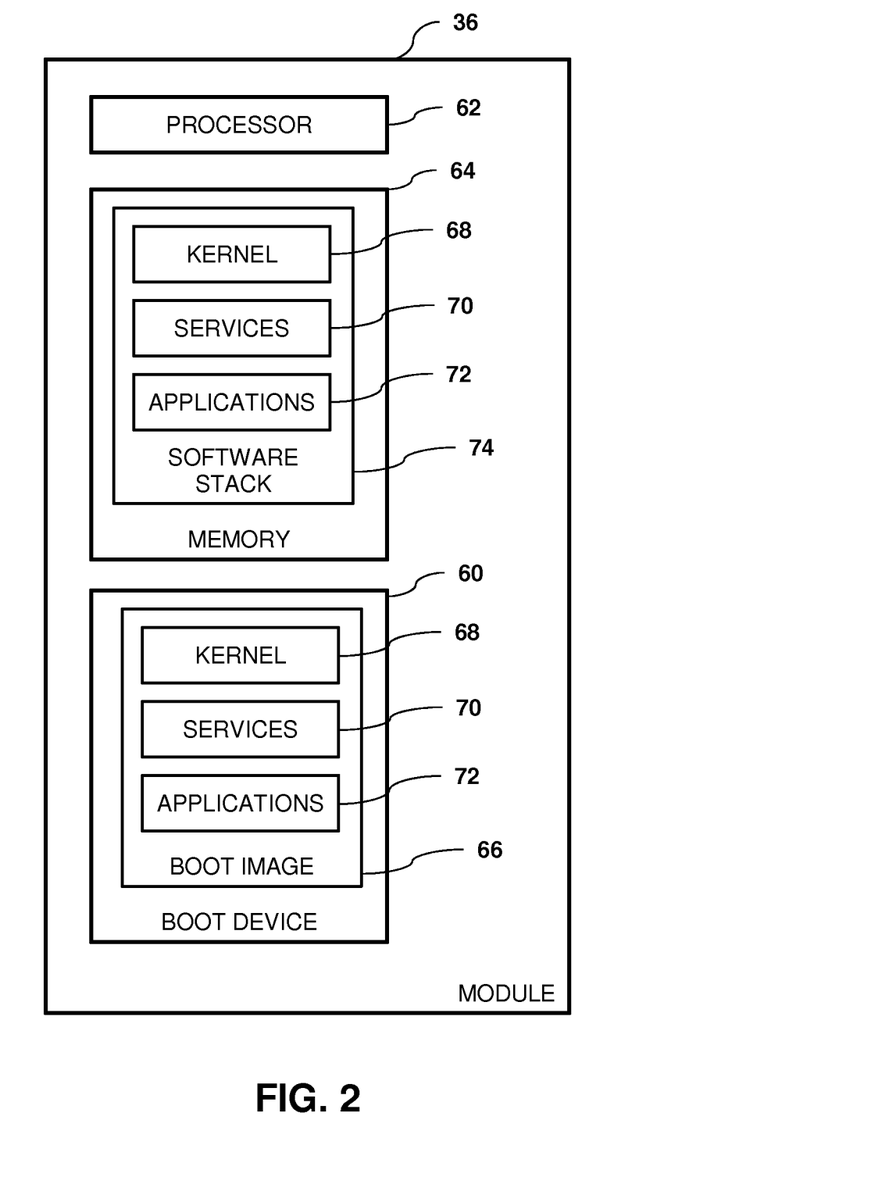
FIG. 2 is a block diagram of a module of the storage system configured to initialize a boot device, in accordance with an embodiment of the present invention.

FIG. 2 is a block diagram of module 36 that is configured to initialize a boot device 60, in accordance with an embodiment of the present invention. Module 36 comprises a processor 62, a memory 64 and boot device 60. In embodiments of the present invention, boot device 60 comprises a writeable storage device such as a hard disk, an optical disk or a solid state drive (SSD). In some embodiments, boot device 60 may comprise a storage device with a removable medium, such as a CompactFlash™ device.

Boot device 60 stores a boot image 66, which comprises an initial set of components that processor 62 executes when power is cycled to module 36. In the example shown in FIG. 2, boot image 66 comprises a kernel 68, one or more services 70 and one or more applications 72. When booting module 36, processor 62 loads boot image 66 to a software stack 74 in memory 64, and starts executing kernel 68, services 70 and applications 72 from the software stack in the memory.

Processor 62 typically comprises a general-purpose computer, which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

While the embodiments describe herein have software stack comprising kernel 68, services 70 and applications 72, any organized collection comprising any number of components in memory 64 is considered to be within the spirit and scope of the present invention. For example, the collection (e.g., software stack 74) may comprise only kernel 72.

Figure 3:
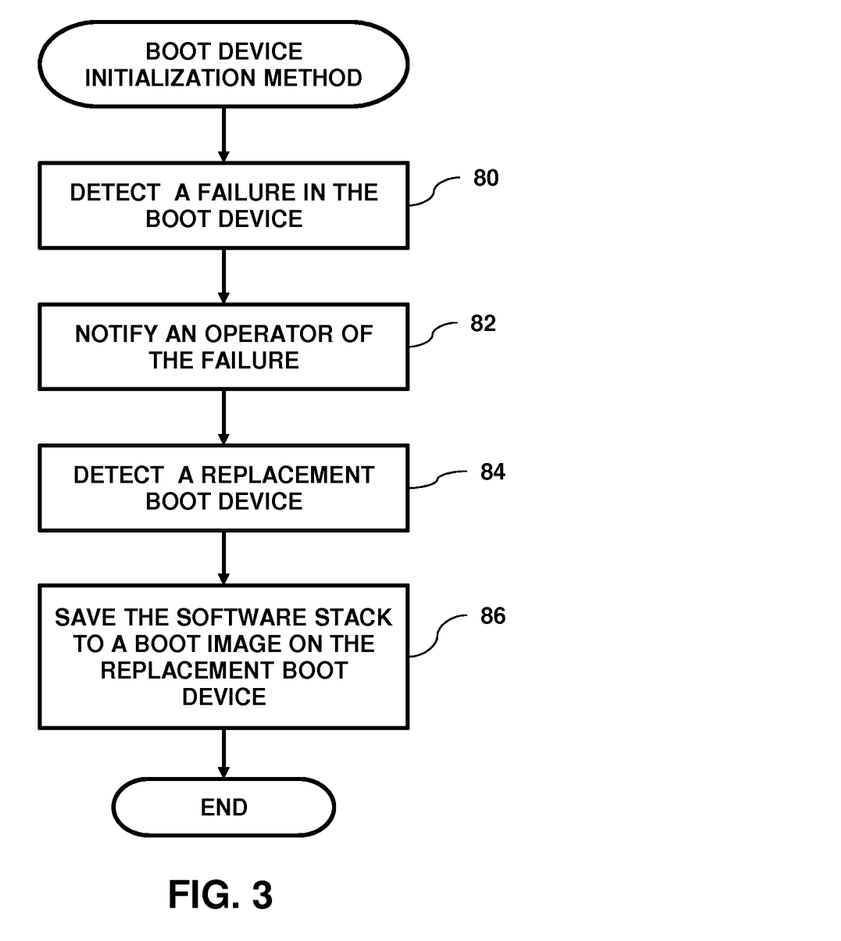
FIG. 3 is a flow diagram that schematically illustrates a method of initializing a boot device, in accordance with an embodiment of the present invention.

FIG. 3 is a flow diagram that schematically illustrates a method of initializing boot device 60, in accordance with an embodiment of the present invention. In a first detection step

80, processor 62 detects a failure of boot device 60 (or a "hiccup", as described supra), and in a notification step 82, the processor conveys a message to given host computer 22 in order to notify an operator (not shown) of the failure. In some embodiments, processor 62 conveys an alert or initiates an event that results in a service notification being issued.

After receiving the notification, the operator (or a technician) can replace the failed boot device with a replacement boot device 60, which typically comprises a blank storage medium. In a second detection step 84, processor 62 detects a functioning boot device 60 (e.g., a replacement functional CF card) that does not have a boot image. Finally, in a save step 86, processor 62 saves software stack 74 to boot image 66 on boot device 60, and the method ends. In some embodiments, for example when boot device 60 has a slow data transfer rate, processor 62 may compress software stack 74, and save the compressed software stack to boot image 66.

Boot Image Update

Figure 4:
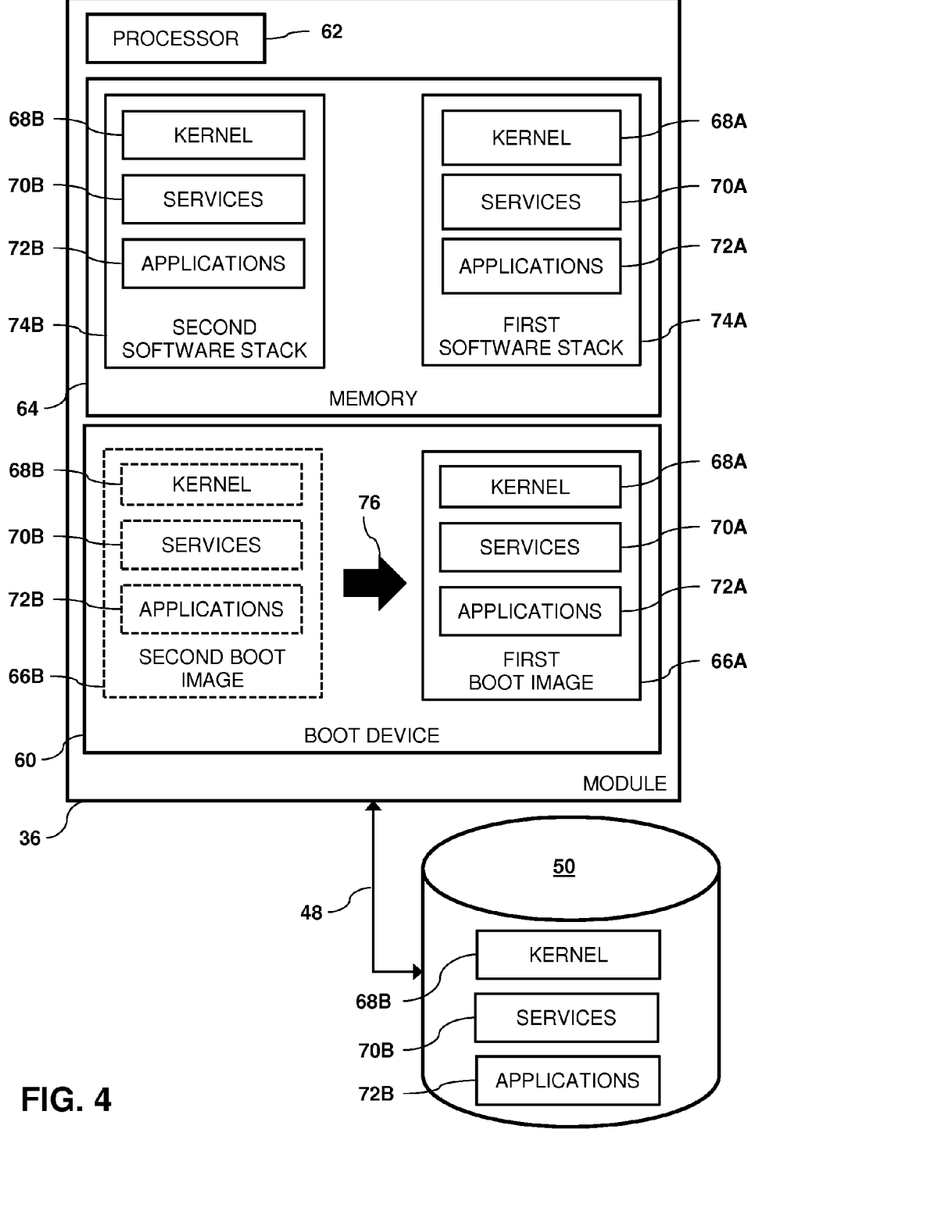
FIG. 4 is a block diagram of a module of the storage system configured to update a boot image on the boot device, in accordance with an embodiment of the present invention.

FIG. 4 is a block diagram of module 36 configured to update boot image 66 on boot device 60, in accordance with an embodiment of the present invention. In the description herein, boot images 66, software stacks 74 and their respective software components may be differentiated by appending a letter to the identifying numeral, so that boot images 66 comprise a first boot image 66A and a second boot image 66B, and software stacks comprise a first software stack 74A and a second software stack 74B.

In the example shown in FIG. 4, processor 62 initially loads first boot image 66A and executes first software stack 74A. Kernel 68B, services 70B and applications 72B comprise updated versions of kernel 68A, services 70A and applications 72A respectively, and are stored on storage device 50. As described hereinbelow, processor 62 can update boot image 66 by first loading kernel 68B, services 70B and applications 72B from storage device 50 to memory 64, so that second software stack 74B comprises kernel 68B, services 70B and applications 72B. In some embodiments, processor replaces, in memory 64, software stack 74A with software stack 74B (i.e., at the same location in memory).

Upon loading second software stack 74B, Processor 62 can then transfer operation from first software stack 74A to second software stack 74B. Upon processor 62 detecting that second software stack 74B is executing correctly, the processor can then replace the first software stack with the second software stack on boot device 60, as indicated by an arrow 76.

While the embodiments describe herein have processor 62 updating all components (i.e., kernel 68, services 70 and applications 72) of software stack 74, updating any number of components in the software stack and the boot device is considered to be within the spirit and scope of the present invention. For example, the only component upgraded in software stack 74 may comprise kernel 68.

Figure 5:
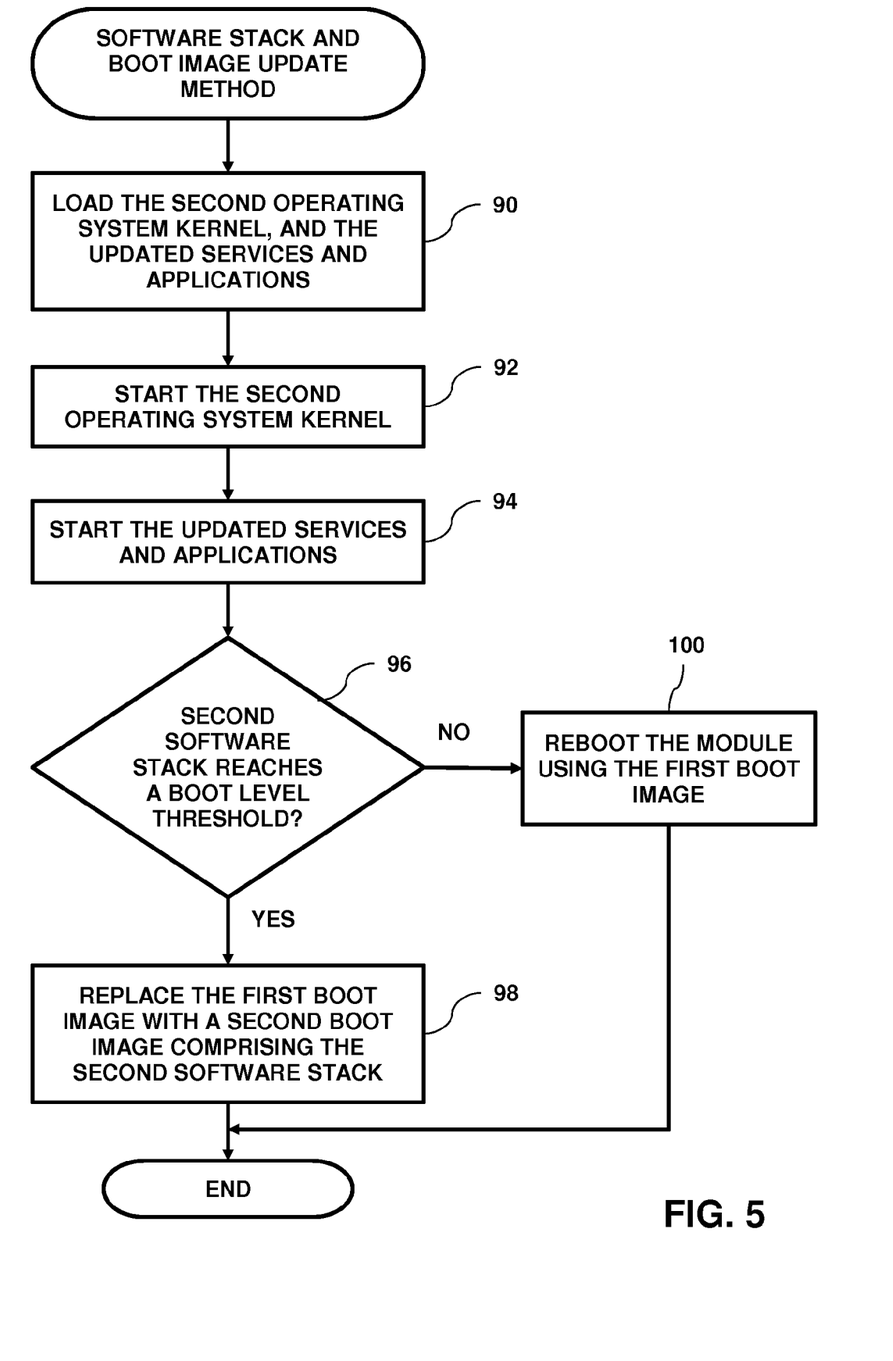
FIG. 5 is a flow diagram that schematically illustrates a method of updating a software stack and the boot image, in accordance with an embodiment of the present invention.

FIG. 5 is a flow diagram that schematically illustrates a method of updating software stack 74 and boot image 66, in accordance with an embodiment of the present invention. As described supra, processor 62 is initially executing components of first software stack 74A that were retrieved from first boot image 66A.

In a load step 90, processor 62 retrieves boot image 66B from storage device 50, thereby loading kernel 68B, services 70B and applications 72B to second software stack 74. In a boot step 92, processor 62 calls the kexec function which first overwrites kernel 68A with kernel 68B and then starts executing (i.e., boots) kernel 68B. After booting kernel 68B, processor 62 starts executing services 70B and applications 72B in a start step 94.

In a comparison step 96, if second software stack 74B reaches a boot level threshold (e.g., when certain services and/or applications have been successfully loaded), then in a replacement step 98, processor 62 replaces, on boot device 60, first boot image 66A with second boot image 66B that comprises second software stack 74B, and the method ends. If processor 62 detects that second software stack 74B fails to reach the boot level threshold (i.e., within a specified time period, or if one of the components on the second software stack fails), then in a reboot step 100, the processor power cycles module 36 to reboot the module using first boot image 66A.

For example, to detect the failure to reach the boot level threshold (i.e., detecting a failure), Processor 62 may detect a failure when executing software stack 74B (i.e., a new software stack) and takes recovery action, due to an event such as a corrupted image (i.e. in kernel 68B, services 70B, or application 72B) on storage device 50, or an execution error in one of the components in the second software stack.

In some instances, processor 62 may reboot module 36 if the processor fails to reach a boot threshold within a timeout (e.g., something happened that prevented the module from successfully transitioning to execute the second software stack). Methods of rebooting module 36 include but are not limited to:

- The module may include a hardware watchdog timer (not shown) that can power cycle the module (or the storage controller) upon the second software stack failing to reach the boot level threshold within a specified time period (i.e., the timer can be canceled upon the module reaching the defined boot threshold, within the specified time period). The hardware watchdog may comprise an independent processor that is configured to power cycle the unit if the timer is not reset.
- The processor can configure other modules 36 in the storage controller to power cycle a given module 36 if the given module fails to communicate a "good" status within a defined time period (i.e., a "timeout").

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A storage system, comprising:
   a memory configured to store a first and a second software stack; and
   a processor configured to:
      execute the first software stack retrieved from a first boot image,
      retrieve and execute the second software stack,
      detect a writeable boot device, and
      save, upon reaching a boot level threshold for the second software stack, the second software stack to the writeable boot device as a second boot image.

2. The storage system according to claim 1, wherein the first or second software stack comprises one or more components that the processor is configured to select from a list comprising an operating system kernel, a service, and a software application.

3. The storage system according to claim 1, wherein the processor is configured to select the boot device from a list comprising a solid state drive, a hard disk and an optical disk.

4. The storage system according to claim 1, wherein the processor is configured to save the second software stack upon detecting the boot device having no boot image.

5. The storage system according claim 1, wherein the processor is configured to save the second software stack by replacing, on the writeable boot device, the first boot image with a second boot image comprising the second software stack.

6. The storage system according to claim 1, wherein the processor is configured to reboot the first software stack upon the second software stack failing to reach a boot level threshold for the second software stack.

7. The storage system according to claim 6, and comprising a timer configured to power cycle the storage system upon the second software stack failing to reach the boot level threshold for the second software stack within a specific time period.

8. The storage system according to claim 1, wherein the processor is configured to execute the first software stack from a location in a memory, and wherein the processor is configured to execute the second software stack by replacing, in the memory location, the first software stack with the second software stack.

9. A computer program product, the computer program product comprising:
   a non-transitory computer readable storage medium having computer readable program code embodied therewith, the computer readable program code comprising:
   computer readable program code configured to execute a first software stack retrieved from a first boot image;
   computer readable program code configured to retrieve and execute, by the processor, a second software stack;
   computer readable program code configured to detect a writeable boot device; and
   computer readable program code configured to save, upon reaching a boot level threshold for the second software stack, the second software stack to the writeable boot device as a boot image.

10. The computer program product according to claim 9, wherein the computer readable program code is further configured to save the first or second software stack upon detecting the boot device having no boot image.

11. The computer program product according to claim 9, wherein the computer readable program code is further configured to reboot the first software stack upon the second software stack failing to reach a boot level threshold for the second software stack.

* * * * *